United States Patent

Wize

[15] 3,700,258
[45] Oct. 24, 1972

[54] VEHICLE PASSIVE OCCUPANT RESTRAINING BELT ARRANGEMENT

[72] Inventor: Gary A. Wize, Washington, Mich.

[73] Assignee: General Motors Corporation, Detroit, Mich.

[22] Filed: June 25, 1971

[21] Appl. No.: 156,892

[52] U.S. Cl. .........................................280/150 SB
[51] Int. Cl. ..............................................B60r 21/10
[58] Field of Search..................280/150 SB; 297/388

[56] References Cited

UNITED STATES PATENTS

| | | | |
|---|---|---|---|
| 3,583,726 | 6/1971 | Lindblad.............. | 280/150 SB |
| 3,506,083 | 4/1970 | Bontick................ | 280/150 SB |
| 3,411,602 | 11/1968 | Royce.................. | 280/150 SB |
| 2,937,882 | 5/1960 | Oppenheim.......... | 280/150 SB |

Primary Examiner—Benjamin Hersh
Assistant Examiner—Robert R. Song
Attorney—W. E. Finken et al.

[57] ABSTRACT

A vehicle passive occupant restraining belt arrangement includes a generally flexible cable with one end attached to the vehicle body generally adjacent the lower end of a windshield pillar laterally of the hinge axis of the adjacent door, a door mounted guide receiving the other end of the cable which extends to within the door for attachment to one end of a helical spring whose other end is fixed to the door, an apertured member slidably receiving an intermediate portion of the cable and connected to lap and shoulder belt portions of a first belt, and a second belt with one end fixedly attached to the apertured member and the other end received by a belt retractor mounted on the door adjacent the other end of the cable. During door opening movement, the cable is moved to a generally outwardly extending orientation and due to the lateral positioning of the one end with respect to the door hinge axis, the effective length of the cable is increased to tension the spring. As the spring and cable are thus tensioned, the retractor extends the second belt while the apertured member slides forwardly along the cable to move the lap and shoulder belt portions to easy-enter positions. During door closing movement, the retractor retracts the second belt and the apertured member slides rearwardly along the cable to move the lap and shoulder belt portions to occupant restraining positions while the cable slackens and moves to a generally longitudinally extending orientation adjacent the lower door edge and generally out of sight. In another embodiment, the one end of the cable slides through a guide mounted on the vehicle body adjacent the lower end of the windshield pillar and is attached to the forward edge of the door laterally of the hinge axis. In this embodiment, the effective change in length of the cable during door movement is increased by the corresponding change in distance between the guide and the end of the cable attached to the forward door edge. When the door is moved to closed position, a resilient member pulls the cable back through the guide and the cable assumes a slackened condition adjacent the vehicle body floor and generally out of sight.

3 Claims, 3 Drawing Figures

PATENTED OCT 24 1972 3,700,258

INVENTOR.
Gary A. Wize
BY
Herbert Furman
ATTORNEY

VEHICLE PASSIVE OCCUPANT RESTRAINING BELT ARRANGEMENT

This invention relates to a vehicle passive occupant restraining belt arrangement.

It is known to provide a vehicle passive occupant restraining belt arrangement in which a carrier is slidably mounted on a vehicle body door and moved between forward and rearward positions in response to door movement to move an attached belt between easy-enter and occupant restraining positions without any deliberate effort on the part of the occupant. U.S. Pat. application Ser. No. 174,664 Weststrate, filed on Aug. 25, 1971, a continuation in part of Application Serial No. 118,607 filed on Feb. 25, 1971, now abandoned, both assigned to the assignee of the present invention, discloses a vehicle passive occupant restraining belt arrangement in which a vehicle body mounted retractor receives a cable connected to shoulder and lap belt portions and selectively retracts and extends the cable in response to door movement to move the belt portions between easy-enter and occupant restraining positions. U.S. Pat. application Ser. No. 118,604, filed on Feb. 25, 1971 and also assigned to the assignee of the present invention, discloses a somewhat similar belt arrangement in which a door mounted retractor receives a belt connected to shoulder and lap belt portions and retracts and extends the belt in response to door movement to move the belt portions between easy-enter and occupant restraining positions.

This invention provides an improved vehicle passive occupant restraining belt arrangement in which a generally flexible elongated member extends between the vehicle body and a door and slidably guides an apertured member attached to lap and shoulder belt portions to move the belt portions between easy-enter and occupant restraining positions in response to door movement.

In one preferred embodiment, the elongated member is a cable with one end fixedly attached to the vehicle body generally adjacent the lower end of a windshield pillar laterally of the hinge axis of the adjacent door. An intermediate portion of the cable slidably receives an apertured member to which is attached lap and shoulder belt portions of a first belt. The apertured member also attaches one end of a second belt whose other end is received by a door mounted retractor. The other end of the cable is slidably received by a door mounted guide adjacent the retractor and extends within the door for attachment to one end of a helical spring, the other end of which is fixed to the door. During door opening movement, the cable is moved to a generally outwardly extending orientation and due to the lateral positioning of the one end with respect to the door hinge axis, the effective length of the cable is increased to tension the spring. As the spring and cable are thus tensioned, the retractor extends the second belt while the apertured member slides forwardly along the cable to move the lap and shoulder belt portions to easy-enter positions. During door closing movement, the retractor retracts the second belt, sliding the apertured member rearwardly along the cable to move the lap and shoulder belt portions to occupant restraining positions, while the cable slackens and moves to a generally longitudinally extending orientation adjacent the lower door edge and generally out of sight.

In another preferred embodiment, the one end of the cable slides through a guide mounted on the body adjacent the lower end of the windshield pillar and is attached to the forward edge of the door laterally of the hinge axis. In this embodiment, the effective change in length of the cable during door movement is increased by the corresponding change in distance between the attached end of the cable and the guide. When the door is moved to closed position, a resilient member pulls the cable back through the guide and the cable assumes a slackened condition adjacent the vehicle body floor and out of sight.

Accordingly, one of the features of this invention is that it provides a vehicle passive occupant restraining belt arrangement in which a generally flexible elongated member extends between the vehicle body and a door and slidably guides an apertured member attached to lap and shoulder belt portions to move the belt portions between easy-enter and occupant restraining positions as the elongated member moves between outwardly and longitudinally extending orientations in response to door movement. Another feature of this invention is that one end of the elongated member may be attached to the vehicle body laterally of the door hinge axis, with the effective length of the elongated member increasing during door opening movement to tension the elongated member as the apertured member slides forwardly and moves the belt portions to the easy-enter positions, and with the elongated member slackening during door closing movement and moving to an out of sight position adjacent the lower edge of the door as the apertured member slides rearwardly and moves the belt portions to the restraining positions. Still another feature of this invention is that the one end of the elongated member may slide through a body mounted guide and attach to the door laterally of the door hinge axis, thus increasing the change in the effective length of the elongated member during door movement and allowing the elongated member to assume a slackened out of sight position adjacent the vehicle body floor when the door is closed.

These features and other features of this invention will be readily apparent from the following detailed description and drawings in which.

Figure 1:
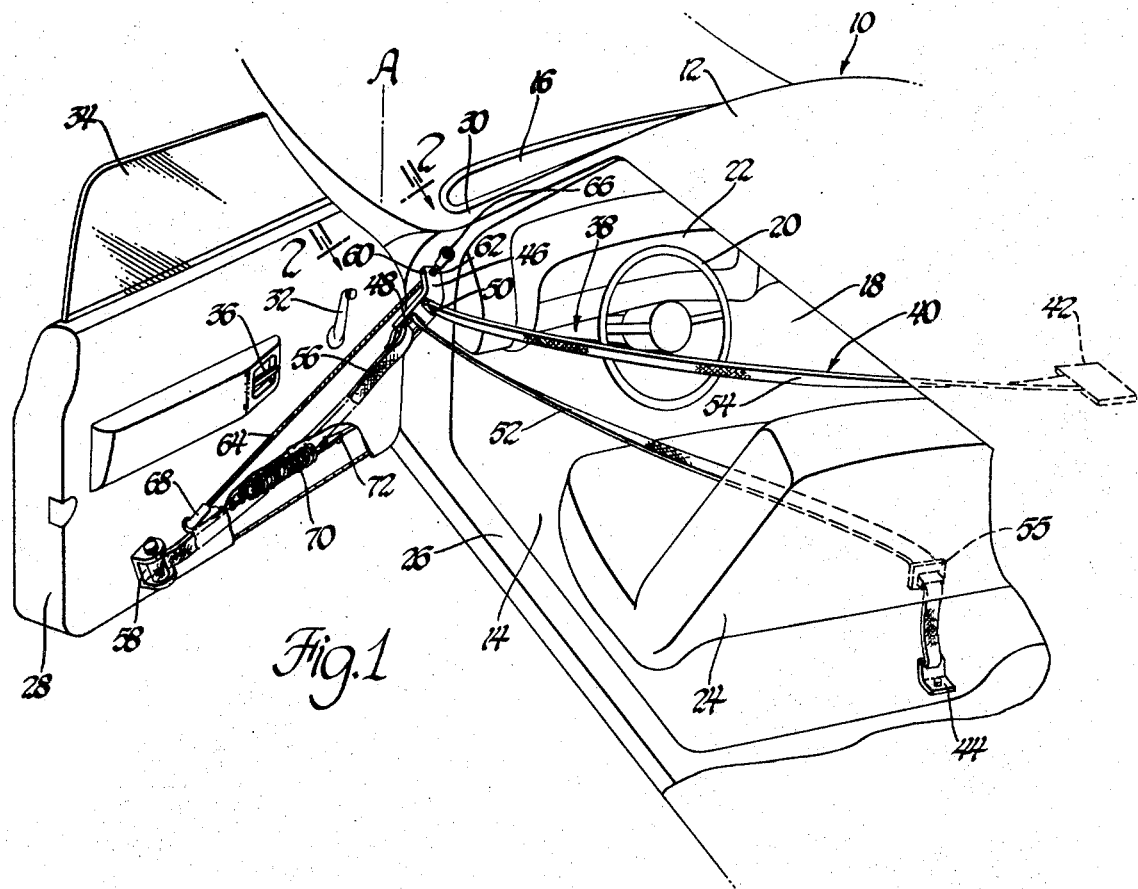
FIG. 1 is a partially broken away perspective view of a portion of a vehicle body with the door shown in open position and a passive occupant restraining belt arrangement, according to this invention, shown in an easy-enter position.

Referring to the drawings, and more particularly to FIG. 1, a vehicle body is generally indicated at 10 and includes a roof 12, a floor 14, and a front windshield 16 that cooperate to define an occupant compartment 18. A conventional steering wheel 20 is mounted within the occupant compartment 18 rearwardly of an instrument panel 22 and forwardly of a conventionally mounted seat 24. Seat 24 is accessible through a vehicle body side door opening 26 selectively opened and closed by a door 28 that swings about a generally vertical axis A located laterally outboard of a windshield pillar 30 at the lateral edge of windshield 16. The door 28 supports a window regulator handle 32 for conventionally raising and lowering a side door window 34 and also supports an inside remote release handle 36 for unlatching a conventional door lock assembly, not shown, mounted adjacent the rear edge of door 28.

Figure 2:
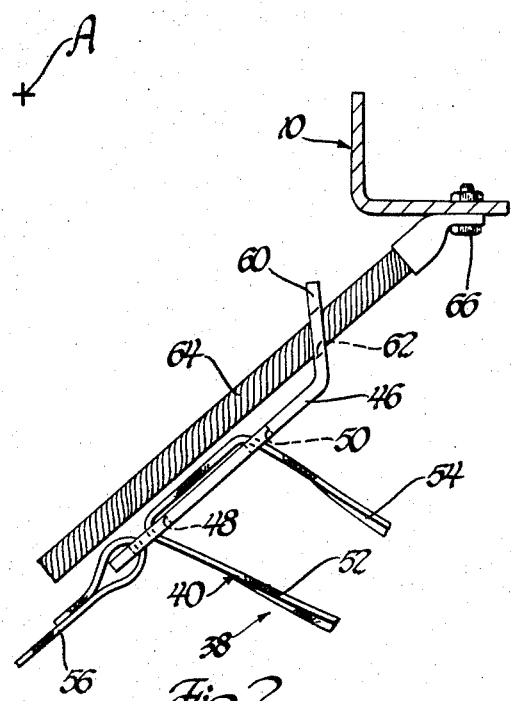
FIG. 2 is an enlarged sectional view of a portion of the belt arrangement taken generally along line 2—2 of FIG. 1 and showing the apertured member which slides along the cable extending between the vehicle body and the door.

A passive occupant restraining belt arrangement 38, according to this invention, is mounted within occupant compart-ment 18 and includes a first belt 40 whose ends are respectively secured to the roof 12 and floor 14 by attachments 42 and 44 adjacent upper and lower rearward inboard portions of seat 24. As can be seen by additionally referring to FIG. 2, a somewhat L-shaped member 46 of the belt arrangement includes apertures 48 and 50 slidably receiving intermediate portions of belt 40 to define lap and shoulder belt portions 52 and 54, with the lap belt portion 52 being positioned adjacent attachment 44 by a seat mounted apertured guide 55. A second belt 56 has a looped end received within aperture 48 and an end received by a belt retractor 58 mounted adjacent a lower rearward portion of the door 28.

Belt retractor 58 may be an inertia retractor which normally retracts belt 56 and allows extending movement of the belt only below a predetermined rate. It is also possible for belt retractor 58 to be a locking retractor in which the retractor free-wheels when either the release handle 36 is actuated or the door lock assembly is in unlatched position, in a manner similar to that disclosed in application Ser. No. 144,470 Augunas et al, filed May 18, 1971, assigned to the assignee of the present invention.

Member 46 also includes an integral laterally extending tongue portion 60 having an aperture 62 that slidably receives an intermediate portion of a cable 64. One end of cable 64 is attached to the vehicle body 10 adjacent the lower end of pillar 30 by a nut and bolt arrangement 66. The other end of cable 64 is slidably received by a generally U-shaped guide 68 mounted on door 28 adjacent belt retractor 58. From guide 68, cable 64 extends within the door for attachment to one end of an elongated helical spring 70 whose other end is secured to the door by an attachment 72. Swinging axis A and nut and bolt arrangement 66 are located at substantially the same longitudinal positions relative to the longitudinal axis of vehicle body 10. However, arrangement 66 is located laterally inboard of axis A and as such during door opening movement, the effective length of cable 64 between arrangement 66 and guide 68 is increased, stretching spring 70 and tensioning cable 64. During door closing movement, the effective length of the cable is conversely decreased and the cable 64 assumes a slackened hanging position extending generally longitudinally of vehicle body 10 adjacent the lower door edge and generally out of sight from within occupant compartment 18.

As the door 28 is opened, cable 64 moves toward the FIG. 1 outwardly extending orientation and member 46 slides along the cable in a generally upward and forward moving direction to the position shown adjacent nut and bolt arrangement 66. With member 46 moved to this position, the lap and shoulder belt portions 52 and 54 are automatically positioned in easy-enter positions without any deliberate occupant effort, allowing the occupant convenient access to the vehicle seat 24. When a seated occupant begins to move the door 28 toward closed position, the retractor 58 will begin to retract belt 56 and member 46 begins to slide rearwardly along cable 64. As the door 28 approaches closed position, member 46 approaches a lower rearward position substantially adjacent the belt retractor 58. As member 46 approaches this position, the lap and shoulder belt portions 52 and 54 move toward occupant restraining positions with respect to the seated occupant and the cable 64 moves toward the slackened position previously described. Door opening movement reverses the operation and moves the belt arrangement 38 to the FIG. 1 easy-enter position allowing the occupant convenient egression from the vehicle body 10 through the door opening 26.

Figure 3:
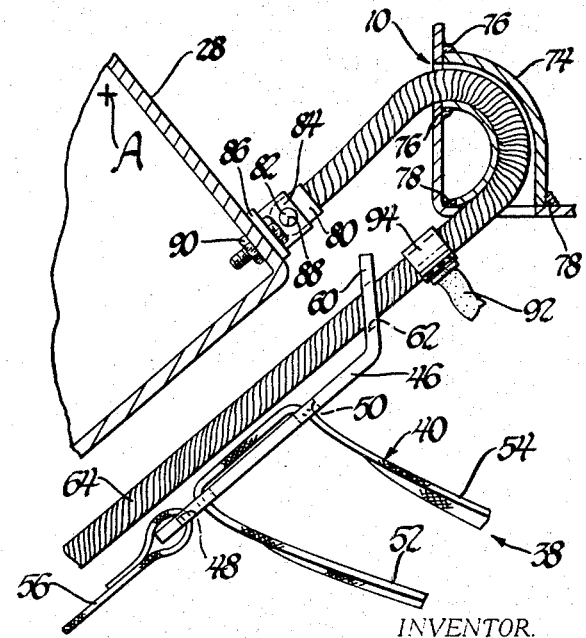
FIG. 3 is a view similar to FIG. 2 of an alternate embodiment.

FIG. 3 discloses another embodiment in which the one end of cable 64 slides through a generally curved tubular guide 74 whose opposite ends are secured to the vehicle body adjacent the lower end of pillar 30 by welds 76 and 78. The one end of cable 64 terminates in an adapter 80 having oppositely extending pin portions 82, only one of which is shown. A pair of spaced opposed upstanding flanges 84 of a pair of bracket members 86, only one shown, are apertured at 88 to pivotally receive the respective pin portions 82 of adaptor 80. Nut and bolt arrangements 90 secure the bracket members 86 to the forward edge of door 28 laterally inboard of the door hinge axis A. When the door is moved between the open position shown and the closed position counterclockwise thereof, the adaptor 80 pivots with respect to the bracket members 86 as the length of cable between the end of guide 74 adjacent welds 76 and the bracket members is decreased and increased. As this cable length decreases during door closing movement, an elastic member 92, whose ends are respectively secured to a cable adapter 94 and the vehicle body floor, pulls the cable 64 back through the guide 74. When the door 28 is moved to closed position, this embodiment thus allows an increased slackening of cable 64 from that of the embodiment of FIGS. 1 and 2, while maintaining a tensioned cable when the door is moved toward open position to allow smooth sliding movement of member 46 along the cable.

The invention thus provides an improved vehicle passive occupant restraining belt arrangement.

What is claimed is:

1. In combination with a vehicle body defining an occupant compartment, a seat mounted within the occupant compartment and accessible through a side door opening, and a side door whose forward edge is pivoted to the vehicle body to mount the door for movement between open and closed positions with respect to the door opening, a passive occupant restraining belt arrangement comprising, a first belt having the ends thereof respectively fixed adjacent inboard upper and lower portions of the seat, an apertured member slidably receiving an intermediate portion of the first belt to define lap and shoulder belt portions, a second belt having one end attached to the apertured member, a selectively lockable belt retractor mounted on a lower rearward portion of the door to receive and normally retract the other end of the second belt, and a generally flexible elongated member extending between an upper forward position on the body generally adjacent the forward edge of the door and a lower rearward position on the door generally adjacent the retractor, the apertured member slidably receiving an intermediate portion of the elongated member, the elongated member moving to an outwardly extending orientation during door opening movement and the apertured member sliding forwardly along the elongated member to an upper forward position as the retractor extends the second belt and the lap and shoulder belt portions move to easy-enter positions, the elongated member moving to a longitudinally extending orientation and the retractor retracting the second belt during door closing movement to slide the apertured member rearwardly along the elongated member to a lower rearward position and move the lap and shoulder belt portions to occupant restraining positions with respect to a seated occupant.

2. In combination with a vehicle body defining an occupant compartment, a seat mounted within the compartment and accessible through a side door opening, and a side door whose forward edge is pivoted to the vehicle body to mount the door for movement between open and closed positions with respect to the door opening, a passive occupant restraining belt arrangement comprising, a first belt having the ends thereof respectively fixed adjacent inboard upper and lower portions of the seat, an apertured member slidably receiving an intermediate portion of the first belt to define lap and shoulder belt portions, a second belt having one end attached to the apertured member, a selectively lockable belt retractor mounted on a lower rearward portion of the door to receive and normally retract the other end of the second belt, a generally flexible elongated member having one end fixed at an upper forward position on the body generally adjacent the forward edge of the door and laterally spaced with respect to the axis of swinging movement of the door, and means for adjustably securing the other end of the elongated member to the door generally adjacent to the retractor to support the elongated member for movement between a slackened generally longitudinally extending orientation when the door is in closed position and a tensioned generally outwardly extending orientation when the door is in open position, the apertured member slidably receiving an intermediate portion of the elongated member and sliding forwardly therealong during door opening movement to an upper forward position as the retractor extends the second belt and the lap and shoulder belt portions move to easy-enter positions, the retractor retracting the second belt and the apertured member sliding rearwardly along the elongated member to a lower rearward position during door closing movement to move the lap and shoulder belt portions to occupant restraining positions with respect to a seated occupant.

3. In combination with a vehicle body defining an occupant compartment, a seat mounted within the compartment and accessible through a side door opening, and a side door whose forward edge is pivoted to the vehicle body to mount the door for movement between open and closed positions with respect to the door opening, a passive occupant restraining belt arrangement comprising, a first belt having the ends thereof respectively fixed adjacent inboard upper and lower portions of the seat, an apertured member slidably receiving an intermediate portion of the first belt to define lap and shoulder belt portions, a second belt having one end attached to the apertured member, a selectively lockable belt retractor mounted on a lower rearward portion of the door to receive and normally retract the other end of the second belt, a generally flexible elongated member having one end slidably mounted on the body generally adjacent the forward edge of the door laterally spaced with respect to the axis of swinging movement of the door, means securing the one end of the cable to a portion of the door laterally spaced with respect to the axis of swinging movement of the door, and resilient means securing the other end of the elongated member to the door generally adjacent to the retractor, the elongated member moving between a generally slackened longitudinally extending orientation when the door is in closed position and a tensioned generally outwardly extending orientation when the door is in open position, the apertured member slidably receiving an intermediate portion of the elongated member generally between the body and the retractor to mount the apertured member for forward sliding movement to an upper forward position during door opening movement as the retractor extends the second belt and the lap and shoulder belt portions move to easy-enter positions, the retractor retracting the second belt during door closing movement and sliding the apertured member rearwardly along the elongated member to a lower rearward position to move the lap and shoulder belt portions to occupant restraining positions with respect to a seated occupant.

* * * * *